(12) United States Patent
DiBiase et al.

(10) Patent No.: US 8,390,829 B2
(45) Date of Patent: Mar. 5, 2013

(54) INKJET PRINTING METHOD USING PRINT MODES SELECTED IN RESPONSE TO IMAGE QUALITY SCORES

(75) Inventors: Richard A. DiBiase, Rochester, NY (US); Douglas W. Couwenhoven, Fairport, NY (US); Guy E. Light, Ontario, NY (US)

(73) Assignee: Eastman Kodak Company, Rochester, NY (US)

( * ) Notice: Subject to any disclaimer, the term of this patent is extended or adjusted under 35 U.S.C. 154(b) by 729 days.

(21) Appl. No.: 12/241,328

(22) Filed: Sep. 30, 2008

(65) Prior Publication Data

US 2010/0079510 A1 Apr. 1, 2010

(51) Int. Cl.
*G06F 3/12* (2006.01)
(52) U.S. Cl. .............. 358/1.13; 358/1.18; 347/5; 347/9; 347/15; 347/43; 101/484
(58) Field of Classification Search .............. 358/1.13, 358/518, 3.23, 1.8, 1.9, 502; 347/9, 5, 15, 347/43
See application file for complete search history.

(56) References Cited

U.S. PATENT DOCUMENTS

| | | | |
|---|---|---|---|
| 4,469,026 A | 9/1984 | Irwin | |
| 4,566,014 A | 1/1986 | Paranjpe et al. | |
| 4,833,626 A | 5/1989 | Malcolm | |
| 4,967,203 A | 10/1990 | Doan et al. | |
| 5,714,990 A | 2/1998 | Courtney et al. | |
| 5,992,962 A | 11/1999 | Yen et al. | |
| 6,517,177 B2 | 2/2003 | Moto et al. | |
| 6,652,060 B2 | 11/2003 | Uchida | |
| 6,775,022 B2* | 8/2004 | Noyes et al. | 358/1.15 |
| 7,168,784 B2 | 1/2007 | Donovan et al. | |
| 2003/0002064 A1* | 1/2003 | Otsuki | 358/1.13 |
| 2006/0238595 A1* | 10/2006 | Park | 347/104 |
| 2007/0008364 A1 | 1/2007 | Ishimoto et al. | |
| 2008/0037069 A1* | 2/2008 | Mestha et al. | 358/3.23 |
| 2008/0217846 A1* | 9/2008 | Shibagaki et al. | 271/264 |
| 2008/0225081 A1 | 9/2008 | Couwenhoven et al. | 347/43 |
| 2008/0309959 A1* | 12/2008 | Martinez et al. | 358/1.13 |
| 2009/0128869 A1* | 5/2009 | Morovic et al. | 358/518 |
| 2010/0013878 A1* | 1/2010 | Spaulding et al. | 347/9 |

* cited by examiner

*Primary Examiner* — Benny Q Tieu
*Assistant Examiner* — Juan M Guillermety
(74) *Attorney, Agent, or Firm* — Kevin E. Spaulding

(57) ABSTRACT

A method of using an inkjet printer to print an input digital image containing at least one color channel having a plurality of rows and columns of pixels sampled at a first resolution, each pixel having a code value, includes partitioning the input digital image into a set of spatially non-overlapping blocks; computing an average code value for each block responsive to the pixels in the input digital image that correspond to the block; computing an image quality score for each block responsive to the average code value for that block; determining a print mode in response to the image quality scores for the set of blocks; and printing the image on the inkjet printer using the print mode.

13 Claims, 6 Drawing Sheets

INKJET PRINTING METHOD USING PRINT MODES SELECTED IN RESPONSE TO IMAGE QUALITY SCORES

FIELD OF THE INVENTION

This invention pertains to the field of inkjet printing systems, and more particularly to a method for reducing image artifacts in inkjet printing.

BACKGROUND OF THE INVENTION

A typical inkjet printer reproduces an image by ejecting small drops of ink from a printhead containing nozzles, where the ink drops land on a receiver medium (typically paper) to form ink dots. A typical inkjet printer reproduces a color image by using a set of color inks, usually cyan, magenta, yellow, and black. It is well known in the field of inkjet printing that if ink drops placed at neighboring locations on the page are printed at the same time, then the ink drops tend to flow together on the surface of the page before they soak into the page. This can give the reproduced image an undesirable grainy or noisy appearance often referred to as "coalescence". It is known that the amount of coalescence present in the printed image is related to the amount of time that elapses between printing adjacent dots. As the time delay between printing adjacent dots increases, the amount of coalescence decreases, thereby improving the image quality. Other image artifacts may arise from printing of adjacent ink droplets in a short period of time. One such artifact is density banding, in which horizontal lines or streaks that vary in density from light to dark appear in the print and degrade the image quality. Another such artifact is gloss banding, in which unwanted variations in the image gloss appear in horizontal bands across the image, degrading the image quality. There are many techniques present in the prior art that describe methods of increasing the time delay between printing adjacent dots to reduce image artifacts using methods referred to as "interlacing", "print masking", or "multipass printing". There are also techniques present in the prior art for reducing one-dimensional periodic artifacts referred to as "bands" or "banding." This is achieved by advancing the paper by an increment less than the printhead width, so that successive passes or "swaths" of the printhead overlap. The techniques of print masking and swath overlapping are typically combined. See, for example, U.S. Pat. Nos. 4,967,203 and 5,992,962. The term "print masking" generically means printing subsets of the image pixels in multiple partially overlapping passes of the printhead relative to a receiver medium.

There are several techniques known in the prior art for reducing image artifacts related to printing adjacent ink drops that teach modifying the printing method based on some analysis of the digital image that is to be printed. For example, U.S. Pat. No. 4,833,626 to Malcolm discloses a method of changing the printhead velocity for each printed line based on an analysis of the data in the line to maximize printer throughput. A similar technique is disclosed in U.S. Pat. No. 5,326,183 to Kasai, et. al.

U.S. Pat. No. 6,517,177 to Moto, et al, discloses a method for printing an image using slow and fast drying inks. The mixture of the slow and fast drying inks is determined based on a measurement of the ambient temperature as well as an analysis of the image data.

U.S. Pat. No. 6,652,060 to Uchida discloses a method of analyzing image data to determine a time delay before printing the second side of duplex print to prevent ink staining or smudging.

U.S. Pat. No. 7,168,784 to Donovan, et al, discloses a method of analyzing an image to determine light and dark regions and create customized print masks, wherein the print mask controls the dots used to print light regions such that they are printed in a fewer number of passes to reduce graininess.

U.S. Pat. No. 5,714,990 to Courtney, et al, discloses a method of printing using an inkjet printer to avoid smearing artifacts that can occur from a subsequent printed page landing on top of a previously printed page that is sitting in the output tray. If the second page comes along too soon (i.e., before the first page has dried), then smearing artifacts can occur. A delay time between pages is used, or the printhead velocity is reduced to achieve the proper amount of time between pages. Similar techniques are disclosed in U.S. Pat. No. 4,566,014 to Paranjpe et al, and U.S. Pat. No. 4,469,026 to Irwin.

U.S. Patent Application Publication No. US2007/0008364A1 to Ishimoto et. al. discloses a method of avoiding density banding and gloss banding artifacts simultaneously in an image by changing the number of nozzles used to print the image on a region by region basis.

It is also known in the art that the amount of coalescence that occurs in a print is dependent on the amount of ink that is printed. Generally speaking, as the volume of ink printed in a given area increases; the likelihood of coalescence will increase. For this reason, coalescence primarily tends to occur in the darker regions of the image. However, not all images will contain artifact-producing regions, so while printing images in a mode that ensures proper time between adjacent drops will produce good image quality; it will result in a long print time, which is displeasing. Additionally, printing images in a shorter time is more desirable, but may result in poor image quality for some images. Therefore, there is a need for a printing method in which each image can be printed in the shortest amount of time while still delivering good image quality.

SUMMARY OF THE INVENTION

In accordance with the present invention, there is provided a method of printing an input digital image containing at least one color channel having a plurality of rows and columns of pixels sampled at a first resolution, each pixel having a code value, using an inkjet printer, comprising:

(a) partitioning the input digital image into a set of spatially non-overlapping blocks;

(b) computing an average code value for each block responsive to the pixels in the input digital image that correspond to the block;

(c) computing an image quality score for each block responsive to the average code value for that block;

(d) determining a print mode in response to the image quality scores for the set of blocks; and (e) printing the image on the inkjet printer using the print mode.

It is an advantage of the present invention that coalescence artifacts are reduced in printed output from an inkjet printer.

It is another advantage of the present invention that coalescence artifacts are reduced automatically based on the content of the digital image that is to be printed.

It is yet another advantage that the image processing required to reduce the coalescence artifacts is performed in a quick and efficient manner, providing for a greater level of user satisfaction.

DETAILED DESCRIPTION OF THE INVENTION

Figure 1:
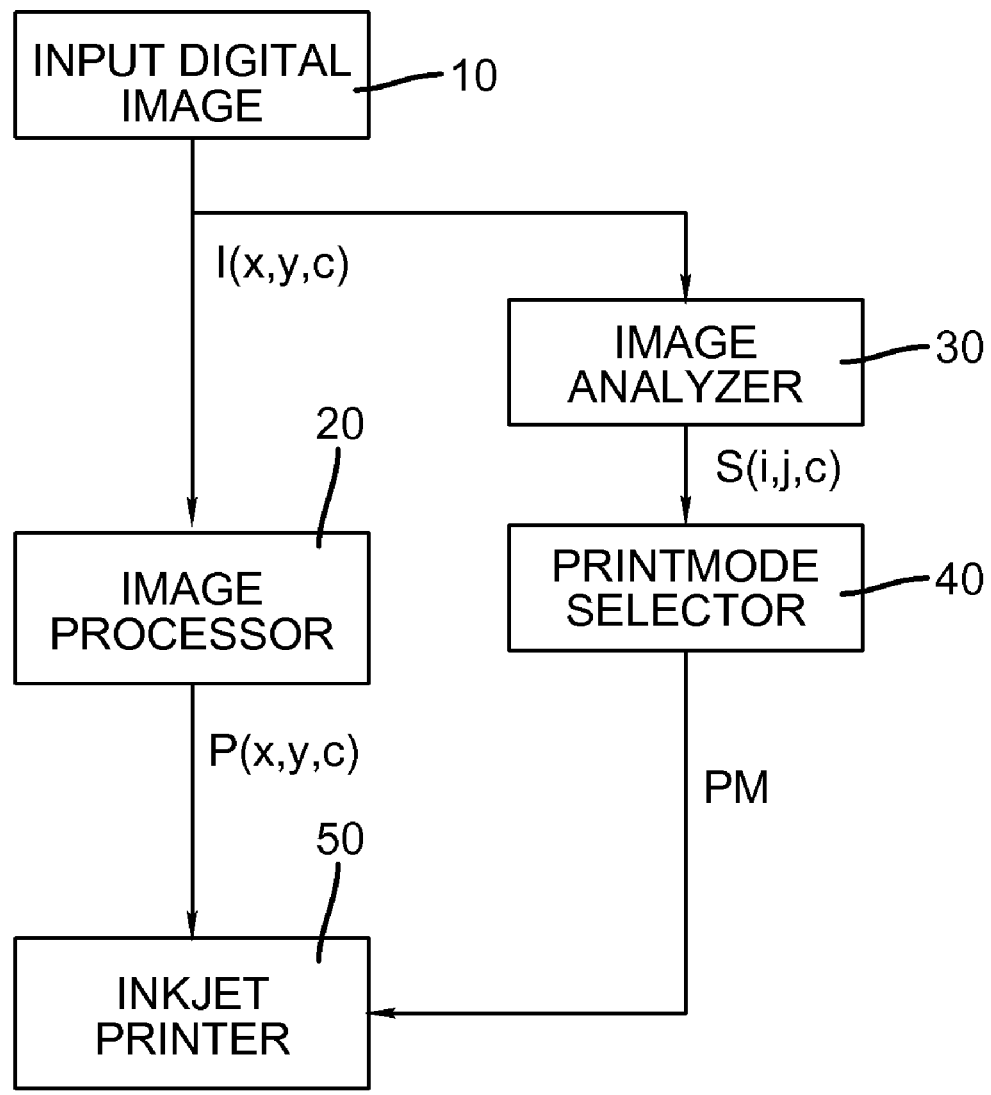
FIG. 1 is a diagram showing an inkjet printer system according to the present invention.

This invention describes a method of printing high quality digital images on a receiver medium using an inkjet printer such that the printed image is substantially free of coalescence artifacts, and is produced by the printer in a quick and efficient manner. Turning to FIG. 1, a typical inkjet printer system is shown in which an image processor 20 receives an input digital image 10 from a host computer (not shown), and performs standard image processing functions such as sharpening, resizing, color conversion, and multitoning to produce a multitoned image signal P(x,y,c), which is then sent to an inkjet printer 50 to be printed. The input digital image I(x,y,c) and the multitoned image signal P(x,y,c) are composed of a set of color data planes hereinafter referred to as color channels. Each color channel corresponds to a particular colorant. In the case of the input digital image, the color channels are typically red, green, and blue primary colors corresponding to the red, green, and blue detectors in a digital camera or the red, green, and blue phosphors in a video display. In the case of the multitoned image signal, the color channels correspond to the ink colors in the printer, such as the cyan, magenta, yellow, or black inks used in a typical inkjet printer. The data including each color channel is a two dimensional array (width=w, height=h) of individual picture elements, or "pixels". Each pixel is typically represented by a digital code value on the range 0-255. The pixel's location in the image is specified by its (x,y) coordinates in the array, where $0 \leq x \leq w-1$ and $0 \leq y \leq h-1$. The x location of the pixel is also referred to as the pixel column number, and the y location of the pixel is referred to as the pixel row number. The term "signal" is used to generically refer to the array of pixels having digital code values that form the image.

The inkjet printer 50 produces the printed image using a printhead containing a set of individual ink ejecting nozzles, usually oriented in a linear array. The printhead is then moved on a carriage horizontally across the paper as the multitoned image signal P(x,y,c) is sent to the printhead to command the printing of the ink dots that correspond to the portion of the page over which the printhead is moving. One motion of the printhead across the page is called a "pass" or "print pass", and the portion of the image that is printed during one pass is called a "swath" or "print swath". After a swath of data is printed, the page is advanced vertically in preparation for the next print pass. As discussed earlier and will be known to one skilled in the art, most inkjet printers employ "multipass" or "print masking" techniques, wherein only a portion of the available locations are printed during each pass, and the page is advanced by a distance less than the swath height, so that the remaining unprinted pixels can be filled in on subsequent passes. The technique of print masking is known to those skilled in the art, and is beyond the scope of the present invention. Of importance to consider, however, is that as the number of print passes increases (i.e., the page is advanced by smaller fractions of the swath height), the amount of time between printing of adjacent drops will increase. This usually will result in a corresponding increase of the image quality, at the expense of an increase in the total print time.

There are other techniques known to those skilled in the art that will produce higher quality output images by changing one or more parameters that control the timing of printing adjacent ink drops and the motion of the printhead and receiver. These parameters include the number of print passes, the printhead velocity, the printing direction (whether the printhead prints unidirectionally in a "left to right" motion, a "right to left" motion, or bidirectionally in both), and others. Collectively, these parameters are called the "printmode". It has been discussed above that changing the printmode provides for a way to tradeoff printing time and image quality. Generally speaking, lower print times result in lower image quality, and higher print times result in higher image quality.

However, this is not the case for all images. For example, images that contain predominantly light tones will print by using ink dots that do not often occupy adjacent printing locations. Thus, there will not generally be coalescence artifacts or other image quality artifacts associated with darker density regions, where the ink dots are printed closer together spatially to achieve the darker tones. Thus, light density images could satisfactorily be printed using a printmode that printed the image faster, resulting in a short print time but still with good image quality. Conversely, images containing dark regions will produce image artifacts if printed too quickly, and require a different printmode to produce acceptable image quality. Thus, still referring to FIG. 1, according to the present invention, an image analyzer 30 receives the input digital image I(x,y,c), and analyzes the image to compute an image quality score signal S(i,j,c), the details of which will be discussed below. A printmode selector 40 determines a print mode in response to the image quality scores for the set of blocks. The printmode selector 40 selects an appropriate printmode to use for the given input digital image that will result in good image quality and a short print time. The selected printmode is then used by the inkjet printer 50 to make the printed image.

Figure 2:
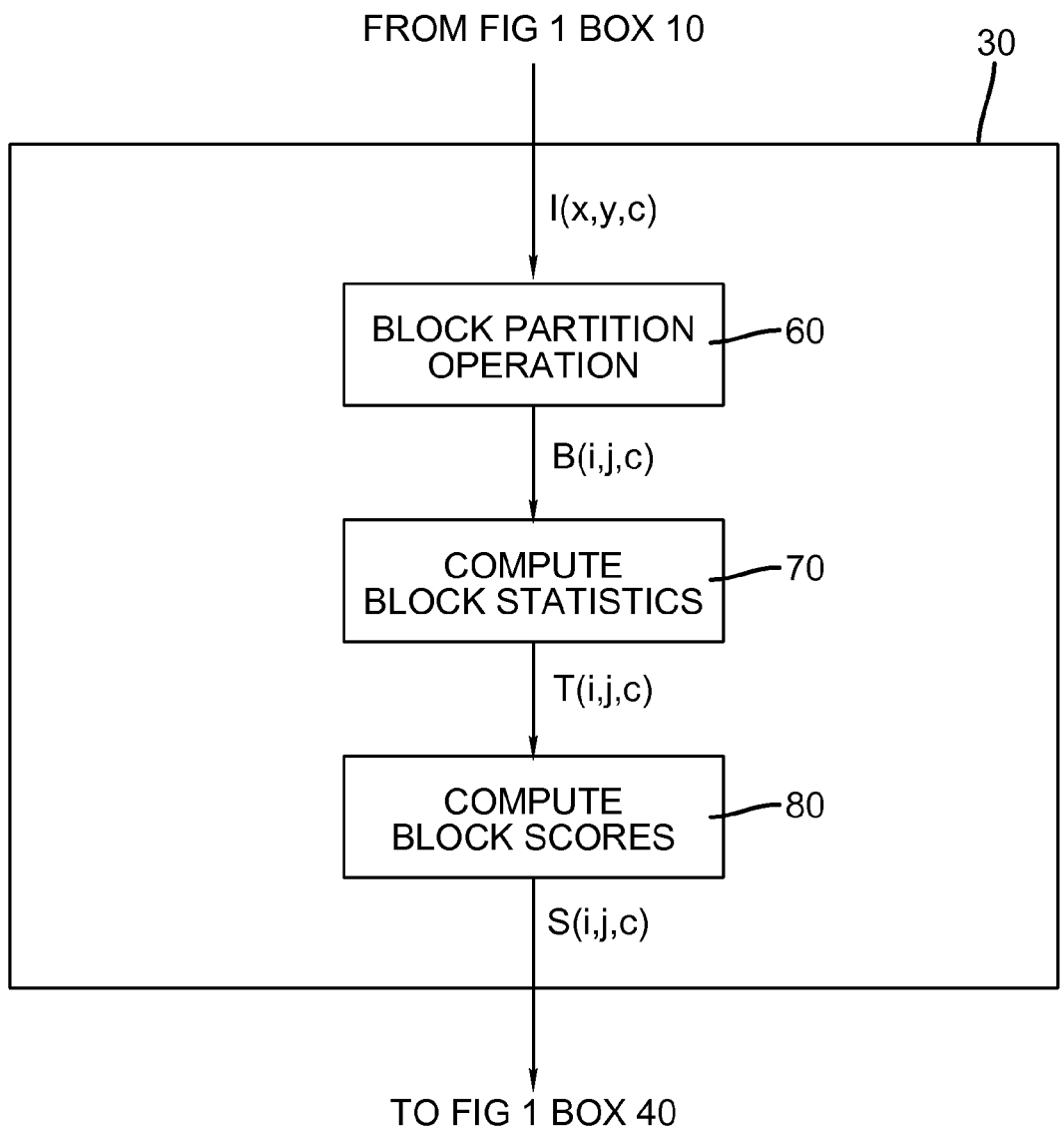
FIG. 2 is a diagram showing the details of an image analyzer.
Figure 3:
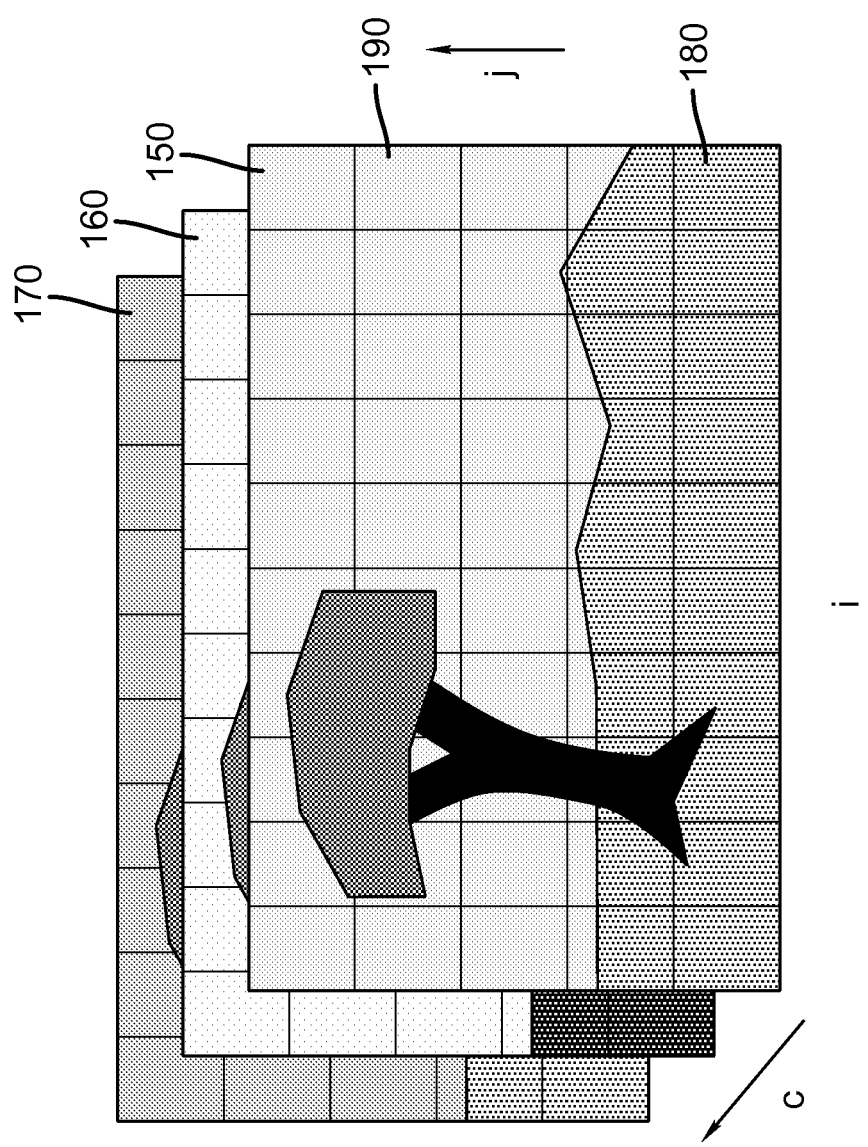
FIG. 3 is an illustration showing the block partitioning of an image.

Turning now to FIG. 2, the details of the image analyzer 30 of FIG. 1 are shown according to a preferred embodiment of the present invention. The input digital image I(x,y,c) is processed by a block partition operation 60 into a set of spatially non-overlapping blocks. FIG. 3 shows an input digital image with 3 color planes 150, 160, and 170, which correspond to red, green, and blue colors respectively in a preferred embodiment of the present invention. Each color plane is partitioned into a set of spatially non-overlapping blocks using the block partition operator 60 of FIG. 2. The index i of the image quality score S(i,j,c) indicates the block column, the index j indicates the block row, and the index c indicates the color channel. The number of blocks to create in the partition and the dimensions of the image blocks can be of any size, but in a preferred embodiment the block size is chosen to correspond to the smallest size of an image region that is likely to produce image artifacts if printed too quickly (i.e., in an inappropriate printmode). Turning back to FIG. 2, a block statistics operation 70 is used to compute a block statistics signal T(i,j,c) for each block of each color channel defined by the block partition operation 60. In a preferred embodiment of the present invention, the block statistics will include the average code value of the pixels contained within the block, but could include other statistical quantities as well, such as the standard deviation, minimum code value, maximum code value, and others.

After the block statistics signal T(i,j,c) is computed for each block, the image quality score signal S(i,j,c) is computed for each block using a block score operation 80, as shown in FIG. 2. The image quality score is a measure of the likelihood of a block to produce image artifacts such as coalescence and gloss banding if the block is printed in a given (default) printmode. In a preferred embodiment, a high value of the image quality score indicates that the block is more likely to produce artifacts, and a low value indicates that the block is less likely to produce artifacts. Thus, the image quality score for a block containing mostly darker tones, such as block 180 of FIG. 3, would be higher than for a block that contained mostly lighter tones, such as block 190.

There are other, non-obvious features of a block that could affect the image quality score within the scope of the present invention. For example, the spatial location of the block within the image could contribute to the likelihood of the block to produce image artifacts. Thus, the image quality score in one embodiment of the present invention is a function of the spatial location of the block. For example, consider a bi-directional printmode in which the printhead ejects ink in both the left-to-right and right-to-left motions over the page, and in which multiple passes are used (this is a common printmode used in the art). In this case blocks near the left and right edges of the image will have a portion of their drops printed closer together in time than blocks in the center of the image, which will have nearly uniform time intervals between the dots printed on subsequent passes. Therefore, blocks at the left and right edges of the image may be more prone to exhibit coalescence or gloss banding artifacts, and therefore would receive a higher image quality score than an identical block of pixels located in the middle of the image. This effect is not recognized in the prior art, and provides an advantage to the present invention.

Additionally, it has been recognized that the occurrence of image quality artifacts is often not easily predicted using simple mathematical formulae from the code values of the input digital image. This is due to a variety of reasons, including the fact that often the different colored inks used in an inkjet printer are made using different chemicals that react differently with each other and the receiver media. For example, cyan and magenta ink when printed together to form a dark blue color may result in undesirable coalescence, but the same total volume of ink printed using magenta and yellow produces no image artifacts. Therefore, a simple prediction of image artifact severity using the total ink volume is not sufficient. The fact that the severity of the image quality artifacts such as coalescence and gloss banding is a complex function of the colorant amounts is not recognized in the prior art, and is handled advantageously in the present invention by using a multidimensional look-up table that is indexed by the average code values of the block. An example of a multidimensional look-up table is shown below in Table 1. In this example, the image quality score that corresponds to a grid of RGB code values is stored. As will be known to one skilled in the art, it is often prohibitive (in terms of computer memory or disk space) to store a fully sampled table that contains entries for every combination of R, G, and B code values on the range 0-255. So, a common technique is to store the table values on a sampled set of RGB code values (spaced by 32 code values as shown in the table below), and either use quantization or interpolation to compute the proper score value. Such techniques will be known to those skilled in the art, and are not of fundamental importance to the present invention.

TABLE 1

| R | G | B | Score |
|---|---|---|-------|
| 0 | 0 | 0 | 100 |
| 0 | 0 | 32 | 91 |
| 0 | 0 | 64 | 72 |
| 0 | 0 | 96 | 59 |
| 0 | 0 | 128 | 41 |
| 0 | 0 | 160 | 29 |
| 0 | 0 | 192 | 22 |
| 0 | 0 | 224 | 19 |
| 0 | 0 | 255 | 18 |
| 0 | 32 | 0 | 80 |
| 0 | 32 | 32 | 66 |
| 0 | 32 | 64 | 60 |
| 0 | 32 | 128 | 51 |
| ••• | | | |
| 255 | | | |
| 255 | 255 | 160 | 1 |
| 255 | 255 | 192 | 0 |
| 255 | 255 | 224 | 0 |
| 255 | 255 | 255 | 0 |

Figure 4:
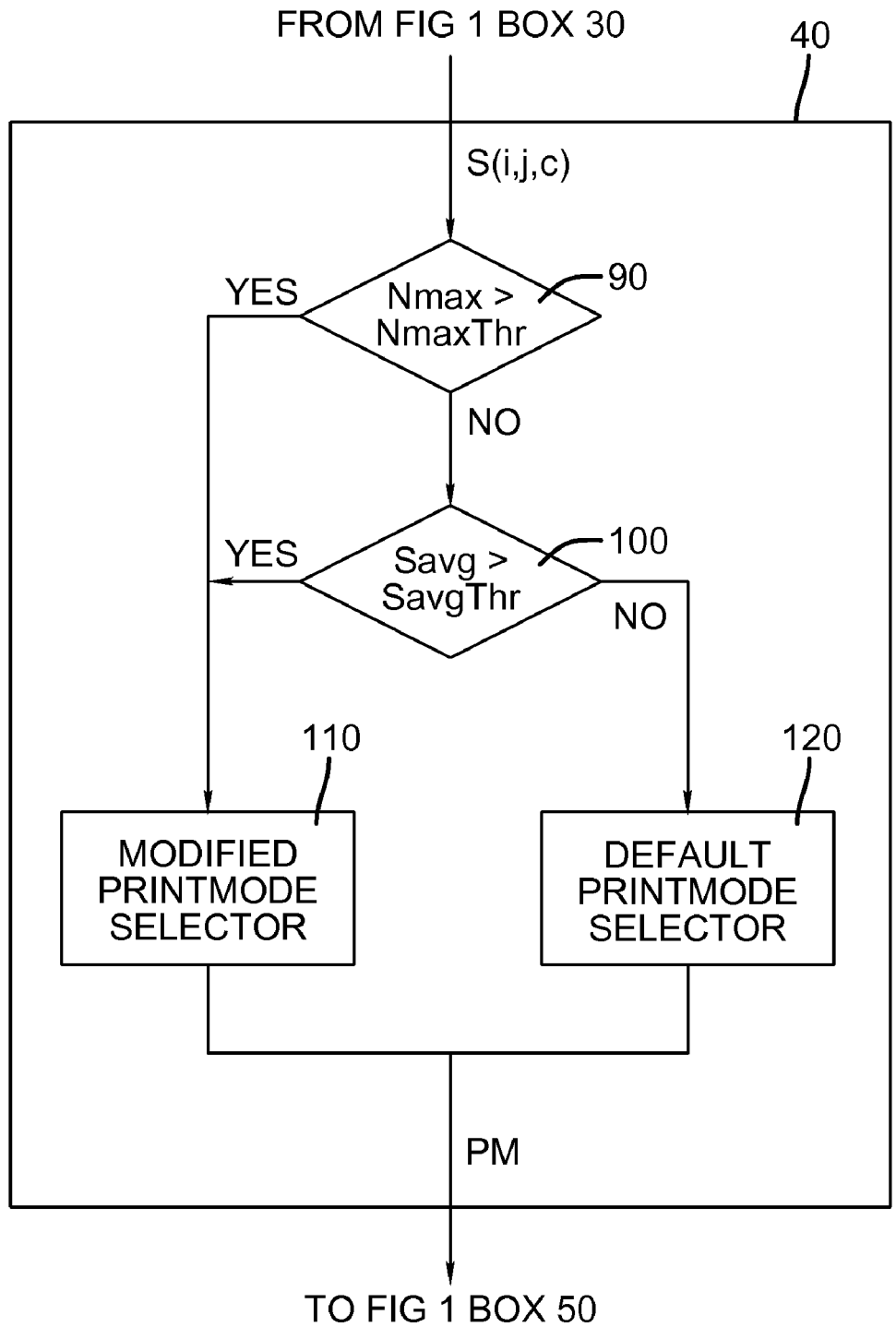
FIG. 4 is a diagram showing the details of a printmode selector.

Turning now to FIG. 4, the details of the printmode selector 40 of FIG. 1 will now be described according to a preferred embodiment of the present invention. In FIG. 4, the image quality score S(i,j,c) is input to a compare operation 90, which counts the number of blocks that have a "large" score value. To do this, a score threshold is chosen, above which a block is considered to have a large score. For example, if the block score range is 0-100, then a score threshold of 90 would indicate that any block with a score of 91-100 would be considered to have a large score. Such blocks with large scores are of importance, because they will tend to produce the most severe image quality artifacts. The number of blocks having a large score is computed, and stored as a variable Nmax. A maximum number of allowable "large score" blocks, NmaxThr, is defined that represents an acceptable level of image quality. If the number of "large score" blocks (Nmax) in the image is greater than the allowable number (NmaxThr), then this indicates that if the image is printed in the default printmode, then it is likely that unacceptable image quality will result. Therefore, to prevent poor image quality, a modified printmode selector 110 selects a printmode that increases the time between adjacent drops sufficiently to prevent poor image quality. As discussed above, the printmode can be modified in a number of ways to achieve this.

Still referring to FIG. 4, if the image does not contain a sufficient number of "large score" blocks that would produce poor image quality, a second test is performed using a compare operation 100. In this case, the average block score, Savg, is computed by averaging the block scores for all of the blocks in the image. A permitted maximum average score, SavgThr, is defined that represents the largest average score that will still generate acceptable image quality if the image is printed in the default printmode. If the average block score (Savg) is greater than SavgThr, then this indicates that the image will likely result in poor image quality if printed in the default printmode, and that a modified printmode should be used. This condition identifies images where there are not many blocks that will produce really bad image quality, but there are a lot blocks that will produce marginal image quality, thereby producing an undesirable result. If neither of the test conditions used in the compare operations 90 and 100 is true, then this indicates that the image will produce acceptable image quality if printed in the default printmode, and therefore a default printmode selector 120 is used to identify the selected printmode.

Figure 5:
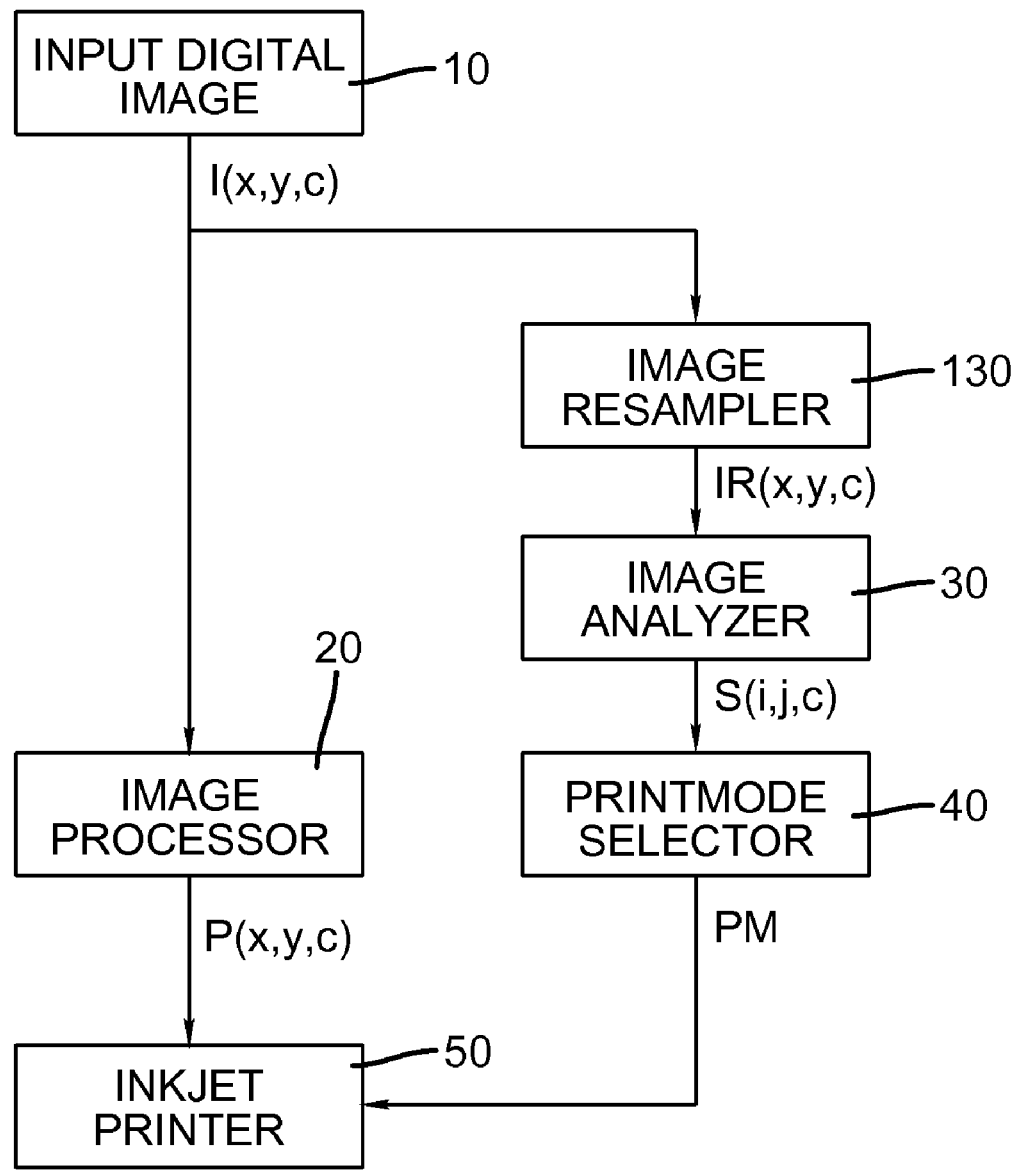
FIG. 5 is a diagram showing another embodiment of the invention using an image resampler.

One significant advantage that the present invention has over the prior art is that the image does not need to be processed through the entire image processing functions of the image processor 20 of FIG. 1 in order to perform the printmode selection. Instead, the present invention operates on the input digital image I(x,y,c). This saves processing time and permits the image analyzer 30 to examine the entire image before selecting a printmode to be used. Additional time savings can be achieved using another aspect of the invention as will now be described. Turning now to FIG. 5, another embodiment of the present invention is described in which an image resampler 130 is used to spatially resample the input digital image I(x,y,c) down to a lower resolution image signal IR(x,y,c). This is advantageous as many fewer pixels will need to be processed through the image analyzer 30, resulting in a faster execution time. Such a processing arrangement is generally acceptable because the image quality artifacts such as coalescence and gloss banding are generally not objectionable in very small areas. Therefore, a low resolution input image is all that is needed to identify areas that might cause image quality artifacts.

Figure 6:
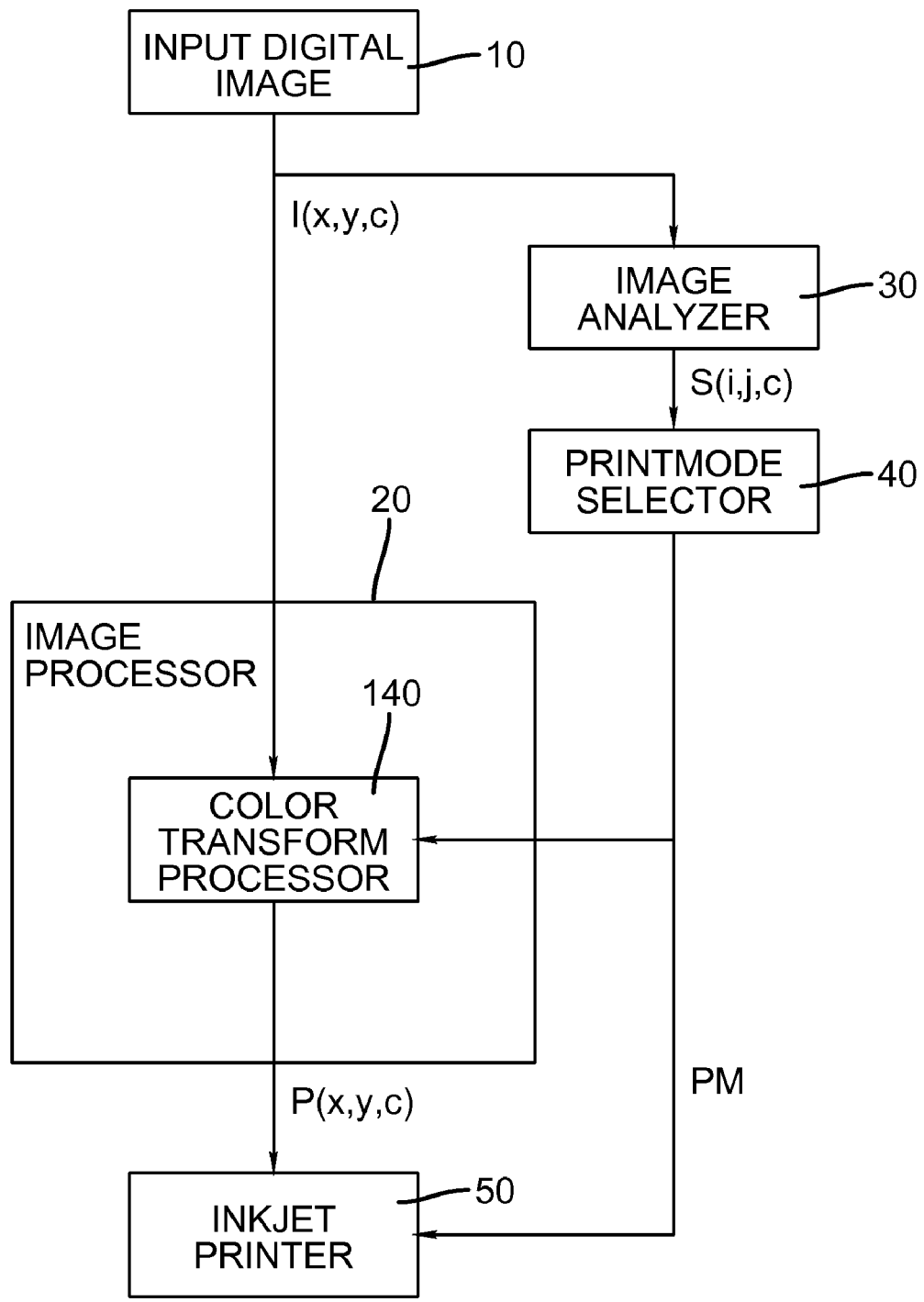
FIG. 6 is a diagram showing another embodiment of the invention using a color transform processor.

Another embodiment of the present invention uses a processing configuration as shown in FIG. 6, in which the printmode that is selected by the printmode selector 40 is used to modify a color transform processor 140. The color transform processor 140 typically uses a multidimensional color table to convert the color signals in the input image (often red, green, and blue) into the color signals required by the printer (typically cyan, magenta, yellow, and black). In this arrangement, it is recognized that in addition to modifying the printmode to produce good image quality, it can also be advantageous to alter the amount of ink that is printed in order to reduce image artifacts. In this case, for example, if an image contains a sufficient number of dark image blocks that would result in unacceptable coalescence, an alternate color table is used that commands less ink volume to be printed, thereby resulting in a reduction of the coalescence artifacts, although at the possible expense of some color gamut or loss of density.

The invention has been described in detail with particular reference to certain preferred embodiments thereof, but it will be understood that variations and modifications can be effected within the spirit and scope of the invention. For example, it will be known to one skilled in the art that it is not necessary to process input digital images with 3 color channels corresponding to red, green, and blue colors, and that images with a different number of color channels or different colorants could equally be used. It will also be known to one skilled in the art that the image processing described within the scope of the invention could be performed on a host computer, or equally well on an embedded CPU or logic within the inkjet printer itself.

Parts List

10 input digital image
20 image processor
30 image analyzer
40 printmode selector
50 inkjet printer
60 block partition operation
70 block statistics operation
80 block score operation
90 compare operation
100 compare operation
110 modified printmode selector
120 default printmode selector
130 image resampler
140 color transform processor
150 color plane
160 color plane
170 color plane
180 image block
190 image block

The invention claimed is:

1. A method of using an inkjet printer to print an input digital image containing at least one color channel having a plurality of rows and columns of pixels sampled at a first resolution, each pixel having a code value, comprising:
    (a) partitioning the input digital image into a set of spatially non-overlapping blocks;
    (b) computing block average code values for each color channel for each block responsive to the pixels in the input digital image that correspond to the block;
    (c) computing an image quality score for each block responsive to the block average code values for that block by using a multidimensional look-up table, wherein the multidimensional look-up table is indexed by the block average code values corresponding to each of the color channels and provides corresponding image quality scores, wherein the image quality score provides an indication of the likelihood of the block producing image artifacts in a particular print mode;
    (d) determining a print mode in response to the image quality scores for the set of blocks;
    (e) resizing the input digital image to form a second digital image containing a plurality of rows and columns of pixels sampled at a second resolution, wherein the second resolution is greater than the first resolution; and
    (f) printing the second digital image on the inkjet printer using the print mode.

2. The method of claim 1 wherein the input digital image has three color channels corresponding to red, green and blue colors.

3. The method of claim 1 wherein the computation of the image quality score for each block is also a function of the spatial location of the block.

4. The method of claim 1 wherein the image quality score for a block corresponds to an amount of coalescence artifacts that would be observed in a printed region corresponding to the block when the image is printed using the inkjet printer.

5. The method of claim 1 wherein the image quality score for a block corresponds to an amount of gloss artifacts that would be observed in a printed region corresponding to the block when the image is printed using the inkjet printer.

6. The method of claim 1 wherein step (d) includes determining the print mode responsive to a number of blocks that have an image quality score larger than a given threshold.

7. The method of claim 1 wherein step (d) includes determining the print mode responsive to an average image quality score for the set of blocks.

8. The method of claim 1 wherein step (d) includes determining the print mode such that an amount of ink that is printed is changed for at least one of the pixels in the image.

9. The method of claim 8 wherein the amount of ink is changed by using a multidimensional look-up table.

10. The method of claim 1 wherein the print mode is determined by changing the number of print passes.

11. The method of claim 1 wherein the print mode is determined by using a unidirectional print direction.

12. The method of claim 1 wherein the printed image is substantially free of coalescence artifacts.

13. A method of using an inkjet printer to print an input digital image having three color channels corresponding to red, green and blue colors, the input digital image having a plurality of rows and columns of pixels sampled at a first resolution, each pixel having code values for each color channel, comprising:

(a) partitioning the input digital image into a set of spatially non-overlapping blocks;

(b) computing block average code values for each color channel for each block responsive to the pixels in the input digital image that correspond to the block;

(c) computing an image quality score for each block responsive to the block average code values for that block by using a multidimensional look-up table, wherein the multidimensional look-up table is indexed by the block average code values corresponding to each of the color channels and provides corresponding image quality scores;

(d) determining a print mode in response to the image quality scores for the set of blocks; and (e) printing the input digital image on the inkjet printer using the print mode;

wherein the multidimensional look-up table provides a first image quality score for a first combination of block average code values corresponding to red, green and blue colors, the first combination having a first sum of block average code values, and the multidimensional look-up table provides a second image quality score different from the first image quality score for a second combination of block average code values corresponding to red, green and blue colors, the second combination having a second sum of block average code values that is equal to the first sum of block average code values.

* * * * *